United States Patent [19]
O'Reilly et al.

[11] Patent Number: 5,551,025
[45] Date of Patent: Aug. 27, 1996

[54] RELATIONAL DATABASE SYSTEM FOR STORING DIFFERENT TYPES OF DATA

[75] Inventors: Daniel L. O'Reilly; Matthew J. Brazier, both of Colorado Springs, Colo.

[73] Assignee: MCI Communications Corporation, Washington, D.C.

[21] Appl. No.: 350,186

[22] Filed: Nov. 30, 1994

[51] Int. Cl.$^6$ .................................................. G06F 17/00
[52] U.S. Cl. .................... 395/600; 395/650; 395/800; 395/183.01; 379/88; 364/DIG. 2; 364/963.5
[58] Field of Search ................................. 395/600, 575, 395/275, 700, 800; 379/88, 92

[56] References Cited

U.S. PATENT DOCUMENTS

| | | | |
|---|---|---|---|
| 5,210,787 | 5/1993 | Hayes et al. | 379/60 |
| 5,259,023 | 11/1993 | Katz | 379/88 |
| 5,274,813 | 12/1993 | Itoh | 395/700 |
| 5,276,867 | 1/1994 | Kenley et al. | 395/600 |
| 5,313,631 | 5/1994 | Kao | 395/600 |
| 5,317,728 | 5/1994 | Tevis et al. | 395/600 |
| 5,351,290 | 9/1994 | Naeini et al. | 379/145 |
| 5,359,512 | 10/1994 | Nishihara | 364/413.01 |

*Primary Examiner*—Thomas G. Black
*Assistant Examiner*—C. Pham

[57] ABSTRACT

In a traffic view server (TVS) system in which the traffic through a telecommunications network is monitored, a database system is provided to enable high processing rate for the TVS, both for inserting the data into the system and for extracting the stored data out for reporting purposes. The database system is structured in three pieces, a first one handling statistics data from records that are collected by a traffic statistics system (MTS), a second one handling enhanced call detail records (ECDR) screened from the MTS, and a last one handling common material references. The statistics data are first stored in a fast response electronic storage medium, after they have been segregated into different basic types of statistics data. The thus segregated basic types of statistics data are then combined and forwarded for long term storage in a magnetic storage medium at a brief period of time after a predetermined time interval. On the other hand, the CDR and reference data are stored directly, but at a steady rate, to respective CDR and reference storage tables.

24 Claims, 4 Drawing Sheets

RELATIONAL DATABASE SYSTEM FOR STORING DIFFERENT TYPES OF DATA

FIELD OF THE INVENTION

The present invention relates to storage systems and more particularly to a database system used by a monitoring system of a telecommunications network for storing different types of collected data which may be utilized to generate reports, and to determine the condition of the telecommunications network.

BACKGROUND OF THE INVENTION

In a telecommunications network, there are usually systems for monitoring the effectiveness of the network. Such monitoring system would collect data relating to the network and store this data in a database system including a conventional magnetic disk memory system. However, for the traffic view server system disclosed in co-pending application entitled "System and Method Therefor of Viewing Call Traffic of a Telecommunications Network" (TVS co-pending application) application Ser. No. 08/351,211 filed Nov. 30, 1994, since abandoned with the filing of continuation application Ser. No. 08/405,988 on Mar. 17, 1995 the fact that the various data being collected are dissimilar and are collected at different rates and amounts means that one single conventional type of memory system is insufficient. For example, a relatively small amount of data A may be collected every minute while a great amount of data B may have to be collected only once per hour. A conventional database system may be appropriate for only one type of data but not the other. In addition, the response of a conventional database is relatively slow.

BRIEF DESCRIPTION OF THE PRESENT INVENTION

In order to be able to collect and disseminate the various types of data detected in a telecommunications network, the present invention database system is structured into three different portions each for handling and storing different types of data. The first portion of the database system handles statistics data, the second portion handles data relating to call details, while the third portion handles common reference data needed for the production of reports and access by customers. The different data being handled by the different portions of the database system of the instant invention are collected at different rates and in different amounts. For example, the statistics data is received for only a short period at the end of a given period of time but at a large amount. On the other hand, the data relating to the call details and the reference data are collected in relatively smaller amounts but at a steady rate.

The first portion of the database system of the instant invention is structured such that it is capable of storing the large amount of statistics data that is detected in the telecommunications network. To achieve this, a plurality of "posters" are used to separate out from the collected records the different types of collected statistics data. The different types of statistics data are then routed to and stored in respective storage files of an electronic fast response memory. These segregated statistics data are collected and stored in the respective storage files for a predetermined time period. For a short period of time at the end of the predetermined time period the respective types of data are routed by corresponding data movers to a slower memory for longer term storage.

While the statistics data is being stored, first to a fast response memory and then to a slower memory for longer term storage, data which does not relate to statistics are stored in a slower memory continuously but at a smaller amount. The same slower memory that is used to store the different types of statistics data may also be used to store the call detail and reference data. Like the statistics data, there are different types of reference data collected from the telecommunications network. These different types of reference data may be stored in their respective storage files, either in the same slower response memory with the statistics data or in a different memory.

The different types of statistics, call detail and reference data thus stored in the present invention database system can then be utilized by either the management of the telecommunications network or customers who have subscribed to special call services of the network to determine the effectiveness of the network, either in terms of the amount and type of traffic traversing through the network, or the amount of traffic that is routed to the special service call numbers of the customers.

It is therefore an objective of the present invention to provide a fast acting database system that is capable of accepting different types of data being monitored and collected from a telecommunications network.

It is yet another objective of the present invention to provide a database system from which a customer who subscribes to a special call service of the telecommunications network may retrieve from the database the different types of data for determining the effectiveness of calls made to his special call service.

BRIEF DESCRIPTION OF THE FIGURES

The above mentioned objectives and advantages of the present invention will become more apparent and the invention itself will be best understood by reference to the following description of the invention taken in conjunction with the accompanying drawings, wherein:

FIG. 1 is an overall view of a traffic view server system to which the instant invention database system is a portion of;

DETAILED DESCRIPTION OF THE PRESENT INVENTION

An overall view of the inventive traffic view system of the TVS copending application, whose disclosure is incorporated by reference herein, is discussed with reference to FIG. 1. As shown, the FIG. 1 architecture basically starts at a plurality of switching means, such as for example a number of switches represented by switch 2, in the telecommunications network. Associated with each switch, for example switch 2, is an Adjunct Processor (AP) 4. One of the main functions of the AP is to perform billing. For each call routed through switch 2, the AP 4 generates a Call Detail Record (CDR). The CDR is routed to an Operator Services System (OSS) network 6 which otherwise may be referred to as a X.25 network. Network 6 in turn is connected to a series of processors commonly referred to as Central Retransmitters (CR) 8. The outputs of the respective CRs 8 are provided to a Fiber Distributed Data Interface (FDDI) ring 10. The output of FDDI ring 10 in turn is connected to a MCI Traffic Statistics (MTS) system 12, which is situated in a platform to which another system, namely a DAP Traffic Statistics (DTS), may also reside.

Figure 1:
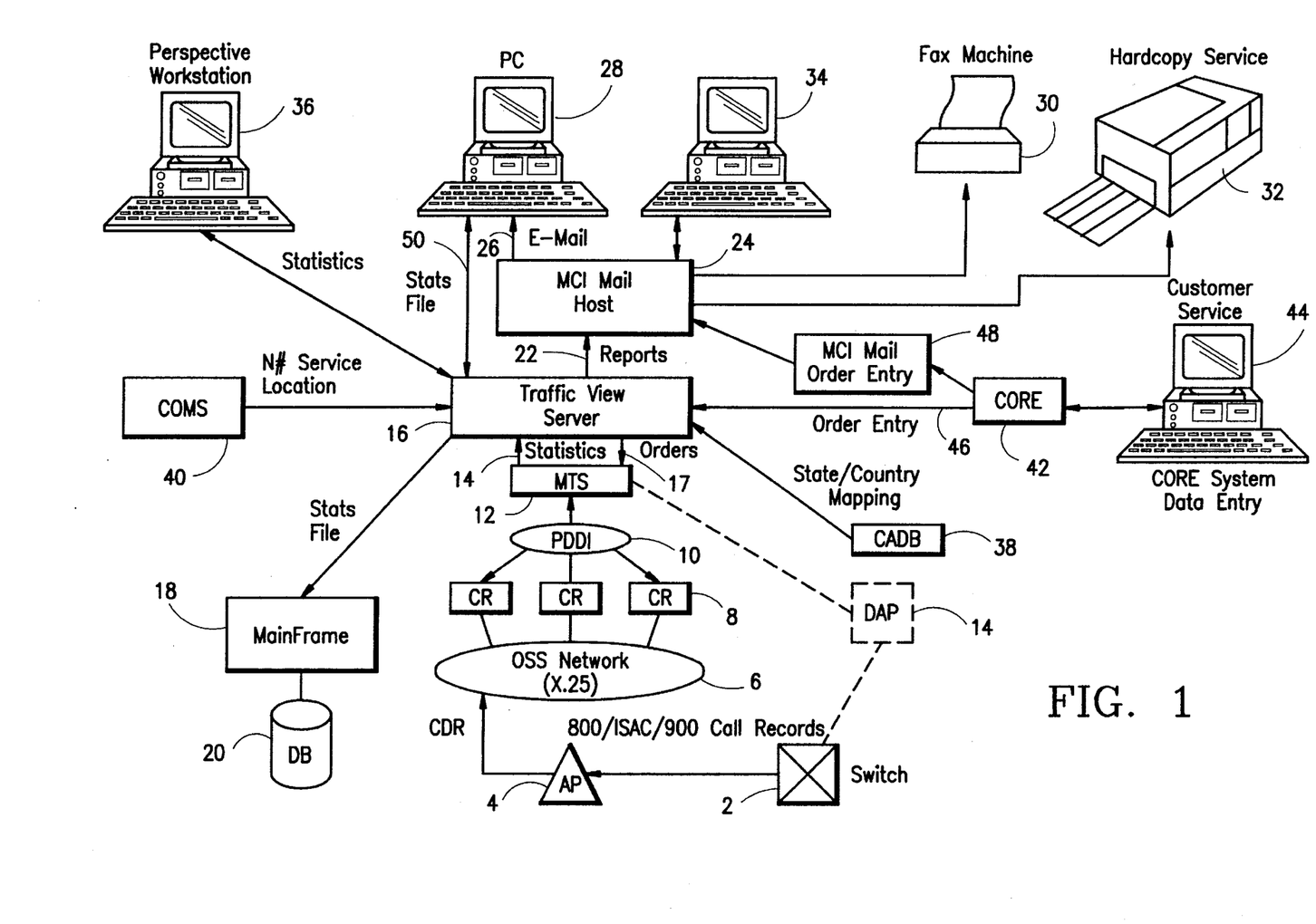

DAP refers to a data access point such as DAP 14 shown in the dotted box of FIG. 1. In particular, DAP 14 is a processor system that provides routing information to switch 2. In addition, DAP 14 also provides information to the MTS (or the combination DTS/MTS system) for the traffic statistics monitoring mentioned in the background of the invention section, supra. A more detailed discussion of a DAP and the DTS is given in copending pending application Ser. No. 125,230 filed Sep. 23, 1993, assigned to the same assignee as the instant invention, and whose disclosure is incorporated by reference herein. For the instant invention, it is suffice to note that the platform to which both DTS and MTS reside is referred to only as the MTS system 12.

MTS system 12 is basically a system for counting the number of calls through the various switches. For the telecommunications network of the instant invention, calls are understood to be special service calls including but not limited to 800, 900 and VNET. For the discussion of FIG. 1, it is assumed that MTS system 12 counts only 800/900 calls, or traffic.

On a periodic basis, MTS system 12 would provide statistics data, also referred to as rolled up statistics, via line 14 to a Traffic View Server (TVS) system 16. As shown, MTS system 12 also receives orders, via line 17, from TVS system 16. For the embodiment of FIG. 1, rolled up statistics are output from MTS system 12 to TVS system 16 at every 60 minute intervals. It should however be understood that the time intervals in which statistics are rolled up from MTS system 12 to TVS system 16 may be varied.

The process by which rolled up statistics are provided from MTS system 12 to TVS system 16 basically occurs as follows. For a given time period, for example every 5 minutes, statistics for customers (subscribers) who have subscribed to the services of the present invention system are accumulated and a customer rolled up peg count message is produced. For the embodiment of FIG. 1, the accumulations are for half hour intervals, with the understanding that future intervals may be set to any time period, for example 20 minute increments. A MTS stats compiler (discussed in detail in the TVS co-pending application) would write the customer peg count messages into a rolled up queue. The rolled up process then reads the queue and adds the peg counts to its customer accumulations. The counts may be contained in a conventional height balance tree, such as the Adelson-Velsky-Landis (AVL) tree of rolled up subscribers. If the subscriber does not already exist on the tree, then he is added. At the end of the rolled up time, the rolled up process sends out the rolled up message. The rolled up customer AVL tree is then deleted and the next rolled up interval starts with an empty tree. Do note that for the FIG. 1 embodiment, only the half hour message is supported.

For the FIG. 1 embodiment, in brief, an example of rolled up statistics of a 800 number for a given subscriber may contain the following different data: that 500 call attempts were made to that 800 number of the subscriber, that 400 of those calls were completed, 50 were not completed (incomplete) and 50 of those calls were blocked. Additional rolled up statistics data may include the destination terminations and the originating Numbering Plan Area (NPA) of the calls.

For the FIG. 1 overall view, it suffice to state that TVS system 16 comprises a number of processors which are represented by a main frame host system 18. Connected to the processor system 18 is a storage means, for example a database system 20 which comprises a plurality of memory disks or other storage mechanisms. A more detailed discussion of the TVS system 16 is given in the TVS co-pending application.

Continue with FIG. 1. As shown, there are a number of systems communicatatively coupled to TVS system 16. In particular, connected to TVS system 16 to receive its outputs, referred to as reports, via line 22, is a data distribution system, also referred to as MCI Mail host 24. Mail host system 24 is a proprietary system of the MCI Communications Corporation (MCI) and is capable of sending out E-Mails, via line 26, to a conventional PC 28 equipped with a modem and appropriate communications software. Mail host 24 can further distribute reports, or data files, from TVS system 16 to a fax machine 30 or as a hard copy message, represented by printer 32, to a subscriber.

Also shown to be connected to mail host 24 is a computer terminal represented as another PC 34. PC 34 may be used to obtain a "probe" report from TVS system 16 or it can obtain Enhanced Call Detail Records (ECDR) from TVS system 16. For the FIG. 1 embodiment, PC 28 may be interchangeable with PC 34. From PC 34, a subscriber can "probe" into TVS system 16 so that he can retrieve a static picture for his special service number for a specific period of time at a specific date. For example, the subscriber may be a TV programmer who runs a special program on a given day where he asks the viewers to dial a 800 number. If the subscriber wants to see exactly how the program did in terms of audience viewership for the previous hour, he can obtain a static picture of that previous hour by using the probe feature, to thereby ascertain the type of business he could expect. For the probe feature, the subscriber, as shown in FIG. 1, is linked to mail host 24. Alternatively, it should be understood that a subscriber may link directly to TVS system 16, per illustration of line 50 between PC 28 and TVS system 16.

Further shown connected to TVS system 16 is a Perspective work station 36. Work station 36 is representative of a plurality of work stations which may be used by the different subscribers of the service of the instant invention to directly access TVS system 16 to retrieve data which the subscribers can then format or design as their own reports, for example inputting data into their spreadsheets. The data file retrieved by work station 36 is referred to as a flat file.

Further shown to be connected to TVS system 16 is a Circuit Availability Database (CADB) 38 which periodically provides TVS system 16, more specifically database 20 of TVS system 16, mapping data to correlate NPAs and NXXs to the different states and localities within the states, and country codes to the different countries for further adding call details for the CDRs.

Also shown connected to TVS system 16 is a Circuit Order Management System (COMS) 40 whose function, for the FIG. 1 embodiment, is to provide a file of maps of the service locations (known as N-code or simply ncodes) to switches/trunks pairs, or regular telephone numbers.

Further connected to TVS system 16 is a Corporate Order Entry (CORE) system 42. CORE system 42 receives its input from subscribers via a CORE system data entry system such as for example a PC 44. In particular, a subscriber can input instructions to CORE system 42 which in turn inputs the instructions as order entries via line 46 to TVS system 16. Some of the data provided by the subscribers to CORE system 42 may include the type of reports the subscribers would like to receive, the number of reports the subscribers want, the frequency and how the reports should be sent, and where the reports should be delivered to. With respect to the method in which the reports are to be delivered, call system 42 sends instructions to a MCI mail order entry system 48, which in turn forwards the instructions to mail host system 24. Consequently, a subscriber who has instructed TVS system 16 that it should sent to him his reports in a E-Mail format would receive his report in a PC format such as that represented by PC 28.

As was mentioned previously, statistics data for subscribes are rolled-up from the MTS system 12 to TVS system 16. These statistics data are then stored by the processor of the TVS system in the memories of database 20. For the instant invention, database 20 is structured as three separate portions, to be discussed with reference to FIGS. 2–4. In brief, a first portion of the database system handles the statistics data collected by MTS system 12. The enhanced call detail data is handled by a second portion of the database while yet a third portion of the database handles the reference data collected by MTS system 12.

As was mentioned previously, statistics for customers are collected from the telecommunications network and are accumulated at specific time intervals. These statistics data are collected by the MTS system 12 and forwarded to TVS system 16, and more precisely to the database system shown in FIG. 2. For the embodiment being discussed herein, it is assumed that there are five basic types of statistics data being collected by MTS system 12. These five types of data are: (1) summary information which includes call attempts, completions, and incompletions; (2) termination information which refers to where the calls were routed; (3) NPA (number plan information) information which refers to what area codes the calls originated; (4) NXX (prefix of a telephone number) information which refers to what area code and prefix the calls came from (as is well known, NXX is the first three digits of a seven digit telephone number that identifies the specific telephone company central office which serves that number); and (5) country information which refers to what country other than World Zone 1 (U.S.A., Canada, U.S. Virgin Islands, Puerto Rico) did the calls come from. Thus, an incoming record from MTS system 12 may contain information for exactly one 800 number, but it can contain all five types of data within that one 800 number.

Figure 2:
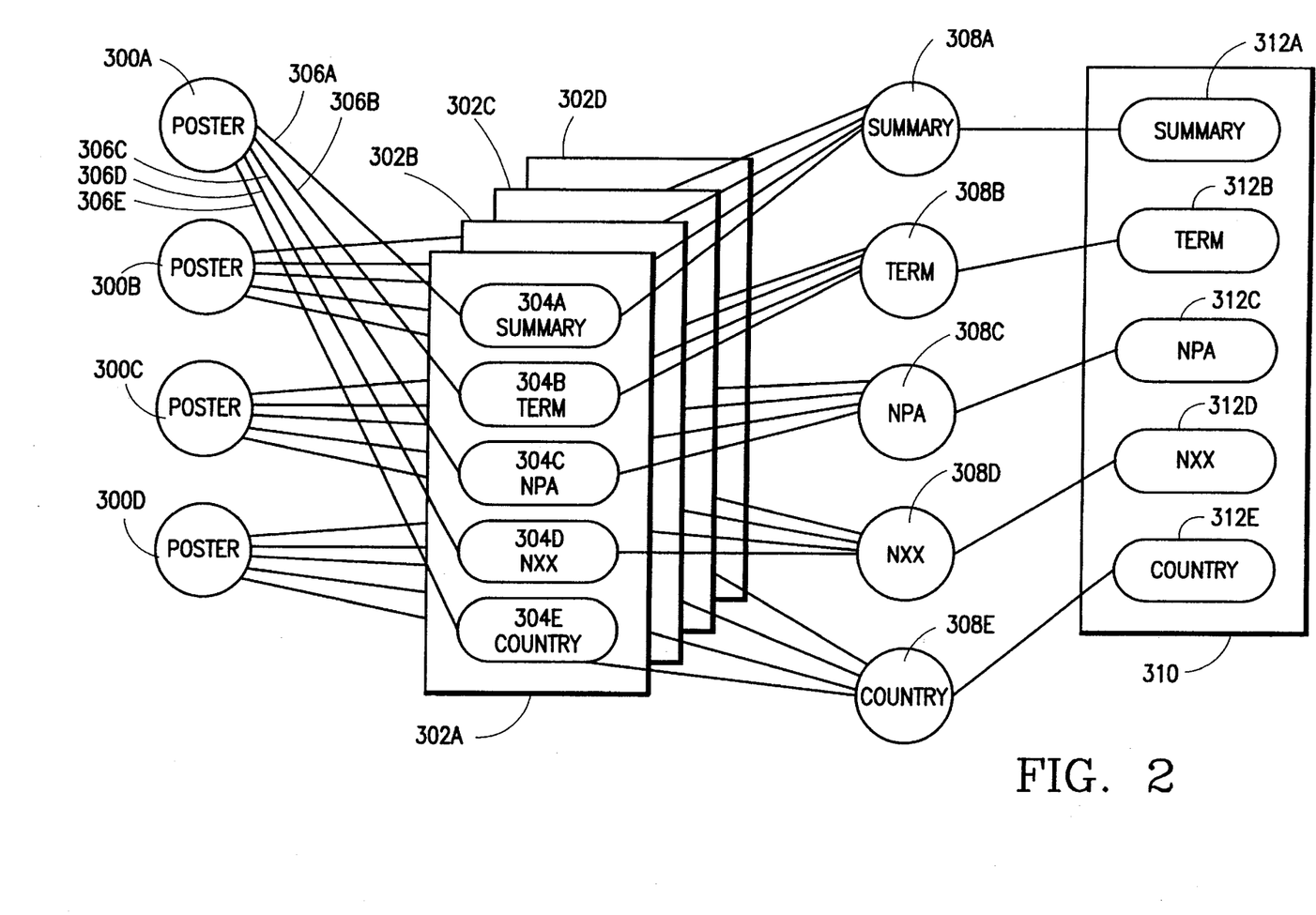
FIG. 2 is a schematic illustrating the different components of a first portion of the database system used by the traffic view server system of FIG. 1.

With reference to FIG. 2, the portion of the database system of the instant invention that handles the statistics data is illustrated. As shown, the FIG. 2 portion of the database system is divided into four sets of components. For the embodiment shown in FIG. 2, it is assumed that there are only four posters, although it should be understood that the number of posters and the other components shown in FIG. 2 may well be different. In essence, a poster, for the instant invention, performs the function of retrieving information collected by MTS system 12 and "posting" that information to the memory means, i.e. a storage medium, of the database system.

In brief, when an incoming record from MTS system 12 is received by TVS system 16, that record usually contains all types of data for a particular special service call such as an 800 number. For the instant invention, it is assumed that this record in fact contains all five types of data mentioned previously. And what the poster does is to segregate the different types of data from the record and route each of the data to an appropriate storage file of a database table.

Prior to the instant invention, there is usually only one database memory containing perhaps multiple tables. But the problem with that is that if multiple processes occur so that different data are being inserted into the same table at once, locking occurs since the different data are in effect trying to update the different indexes of the database table all at once. This in turn causes severe database contention problems. This is particularly true with respect to the traffic view server system of the instant invention inasmuch as a great amount of data has to be provided to the database system in a relatively short period of time.

As shown in FIG. 2, the way in which the instant invention database overcomes the problem of contention by the different pieces of incoming data is by using a plurality of posters 300A–300D. These posters 300 are in turn connected to a set of database tables 302A–302D. Insofar as there are four posters for the embodiment of FIG. 2, there are likewise four sets of tables 302 each corresponding to one of the posters. Likewise, if there are five posters 300, there would be five sets of tables 302. Each set of tables 302 resides in an extremely fast type of electronic storage, for example a fast response electronic disk storage medium rather than a magnetic disk.

As shown, each table set 302 has five different tables (storage flies) therein designated 304A–304E, respectively, representing the summary data, the termination data, the NPA data, the NXX data and the country data. For the FIG. 2 embodiment, although not clearly shown as such, it should be understood that poster 300A is connected to table set 302A and provides information to tables 304A to 304E therein, while posters 300B–300D provide information to tables 302B–302D, respectively. Thus, as shown, poster 300A is connected to table set 302A, and more particularly to summary tables 304A via line 306A, termination table 304B via line 306B, NPA table 304C via line 306C, NXX storage 304D via line 306D and country table 304E via line 306E.

For the FIG. 2 embodiment of the instant invention, assume that table sets 302 are to store information collected by MTS system 12 for each hour, and that MTS system 12 feeds the information to the database of the TVS system for only 5 minutes alter the end of the hour. In other words, posters 300 begin operation at 10 minutes past an hour to begin to receive an information from MTS system 12, to process that data and to segregate them to be stored in the appropriate storage files in table 302. At the end of the 5 minute interval, i.e., at the end of the feed from MTS system 12, a check point message is received from the MTS system to indicate that the last of the data for that hour having been collected by MTS system 12 has been sent. At that point, posters 300 return to inactive status and a plurality of data movers, designated as 308A to 308E, begin their operation. As a point of clarification, the amount of statistics data that are received once an hour by the posters which need to be input to database 20 could be on the order of 200,000 records. In others words, 200,000 records have to be processed in only a few minutes.

As shown, there are five data movers 308A–308E, each corresponding to one of the storage files, or one of the basic types of statistics data, stored in tables 302. Putting it differently, for the FIG. 2 embodiment, data mover 308A retrieves all of the summary data from the respective summary tables of table sets 302A–302D. Likewise, termination data mover 308B retrieves the termination information from the respective tables of table sets 302A–302D; the NPA data mover 308C retrieves the respective NPA data from the corresponding tables of table sets 302A–302D, the NXX data mover 308D retrieves the NXX data from the respective tables of table sets 302A–302D, and country data mover 308E retrieving the country data from the corresponding tables of table sets 302A–302D. Each of the data movers 308 then combines the data from the different storage files and route the combined particular type of statistics data to a slower memory means, such as magnetic memory storage disk 310.

As shown, memory 310 is partitioned to have a plurality of storage files 312A–312E, each of which is connected to a corresponding one of the data movers 308. Thus, memory 310 has summary table (or storage file) 312A, a termination table 312B, a NPA table 312C, a NXX table 312D and a country table 312E. Memory 310, inasmuch as it is a slower type response memory, is also less expensive than the electronic memory utilized for tables 302 which may in fact be random access memories (RAMs). And inasmuch as memory 310 is relatively inexpensive, a plurality of tables 310, for example 45 of them, may be utilized serially so as to keep multiple days (for example 45 days) worth of data. In other words, given the example of 45 sets of tables 310, 45 days worth of data may be stored in memory 310 so that either the management or customers can retrieve information from any one of those stored 45 days for review purposes.

For the FIG. 2 example embodiment, therefore, after 45 days, the oldest data is deleted so that that particular storage table is freed for the next day's data. The same data storages are thus continuously rotated so as to be reused. This first in first out (FIFO) deletion of stored data is performed every day, during nightly maintenance of the TVS system. For the FIG. 2 embodiment, then, memory 310 may be referred to as the permanent storage while memory 302 may be referred to as a temporary storage table.

The relational technology used by the FIG. 2 embodiment is represented for example, by the Digital Equipment relational database product which was recently sold to the Oracle Company. Such relational technology allows the implementation of a report from data derived from the previous hour, with part of the data residing in the temporary memory tables 302 and a more permanent part of the data residing in the storage tables of slower memory 310. Thus, a consistent view of the data collected by MTS system 12 is available to whoever wants to look at it while the data is moved from a temporary storage such as memory 302 to a more permanent storage such as memory 310.

Figure 5:
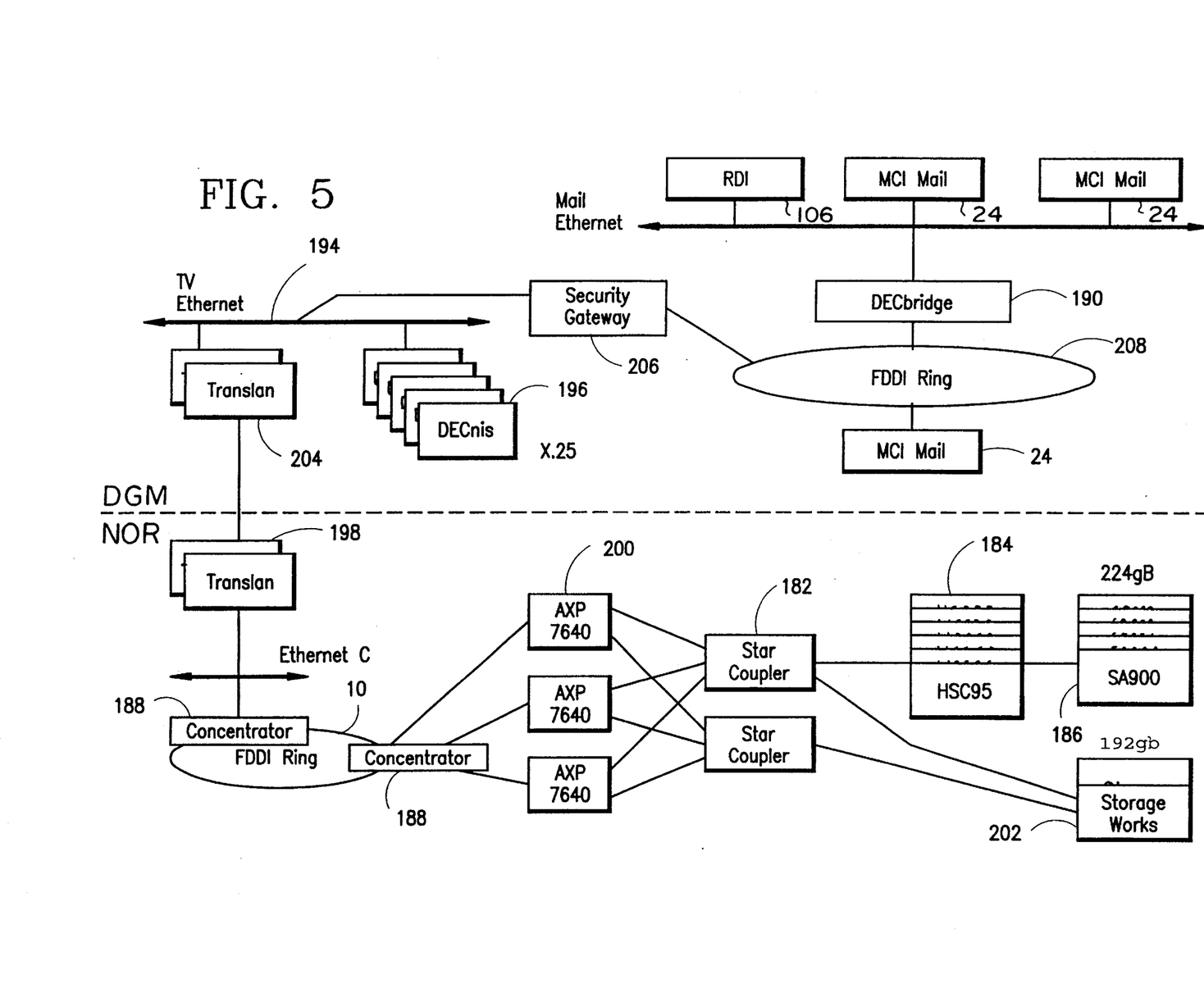
FIG. 5 is an overall view of the hardware components of the traffic view server system of FIG. 1 including the memory components of the database system of FIG. 1.

Posters 300 and data movers 308 together perform the function represented by the MTS message process shown in FIG. 5 of the TVS co-pending application. It should be noted that although memories 302 and 310 are discussed as being separate memories, they both may in fact be part of database 20 of FIG. 1.

Figure 3:
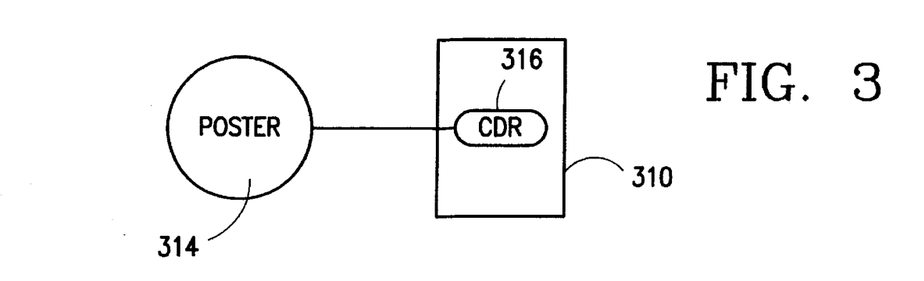
FIG. 3 is a schematic of another portion of the database system which handles data relating to call details.

With reference to FIG. 3, the second portion of database system 20 for storing call detail information is illustrated. Before discussing the database system portion shown in FIG. 3, attention should be directed to the fact that the problem associated with the storing of statistics data is quite different from the problem associated with the storing of call detail data, or for that matter the reference data to be discussed later. Specifically, there is a large amount of statistics data, in the form of records, that need to be processed and stored in the database system in a very brief period of time, for example a period of 5 minutes. For call details retrieved from the records, however, only a moderate amount of data, in the range of approximately 200–300 per second need to be stored into the database. However, the storage of this moderate amount of data needs to be constant as this type of data comes in a steady stream. In other words, the call detail information cannot be first stored into an electronic storage medium before permanent retention in a magnetic storage medium. Putting it differently, the call detail information needs to be input to a long term storage from the start.

Keeping the problem associated with storing call detail data in perspective, with reference to FIG. 3, it can be seen that the second portion of the database system of the instant invention also has a poster 314. But in this case insofar as the call details are extracted from each record, only one poster is needed. Poster 314 is connected directly to a call detail records table 316, which may be a part of magnetic storage 310. Hence, the call detail records (CDR) for each day are ted to a corresponding one of a plurality of long term storage memories 310. Similar to the statistics store portion of the database shown in FIG. 2, approximately one month's worth of CDRs, i.e., 33 tables, are provided in database 20. As before, nightly maintenance automatically rolls the data in the database forward, in a FIFO fashion so that the oldest data is discarded after a certain number of days, its memory space being utilized for storing the newest data. In order to identify the various tables of memory 310, a suffix for the year, month and day could be stamped to each of the table, for example 19941027 for identifying the information that has been stored for Oct. 27, 1994. This enables an operator, or a customer, to generate reports based on a given date within the one month storage window.

Figure 4:
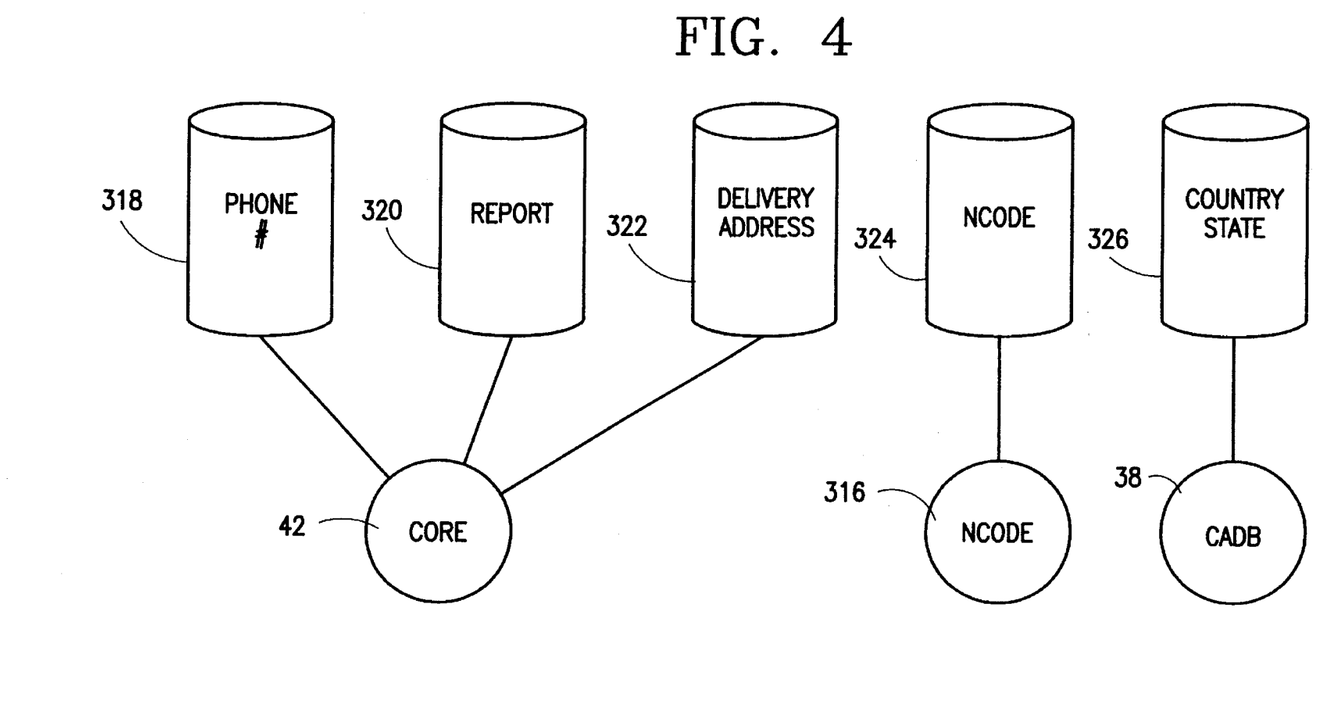
FIG. 4 is a diagram illustrating yet another portion of the database of the instant invention which stores in particular the reference data collected by the MTS system of FIG. 1.

The third portion of the database system of the instant invention is the reference database, which is illustrated in FIG. 4. The reference database of FIG. 4 is used to store the common reference information that is needed to generate different types of reports. In particular, it may contain the customer phone number, the type of report or the format of the report that a customer wants, the delivery address for the reports, the ncode mapping tables and the country and state mapping tables.

The phone number and report information are provided by the CORE system 42 (FIG. 1). The ncode information is provided by ncode processing 316 (discussed in more detail in the TVS co-pending application). The country and state tables are provided by the CADB system 38. See FIG. 1. The ncode information and the country/state information are used in conjunction with the statistics and call detail data to determine how the reports are to be generated, when they are to be generated, to whom the reports should be sent, the mapping of ncodes, and the city/state names to the area codes and the prefixes. As shown in FIG. 4, the phone number data is stored in a table or storage file 318, the report data in a table 320, the delivery address information in a table 322, the ncode information in a table 324, and the country/state information in a table 326. All of tables 318 to 326 may be part of database 20 and in fact may be formed of the slower type of response memory such as a magnetic type of memory storage. On the other hand, since the amount of reference data is not large, the reference data may be stored in an electronic type of memory storage for faster retrieval.

The respective subsystems of FIGS. 2, 3 and 4 are tied together in terms of how a user can actually retrieve information from each of them. For example, if a user were to do a statistics report, he would obtain the report information from the report table 320 of the reference database. The report data guides the user on the kind of report the user needs to do. The statistics can be retrieved by the user from the statistics database of FIG. 2 and input to the report. How the report is to be delivered of course is based on information retrieved from the delivery address table 322 from the reference database. Any information relating to call details is retrieved from the call details database 316 of FIG. 3. At the same time, country and state mapping may be obtained from the country/state table 326 of the reference database in order to label the report with the correct city, state or country. Thus, all of the data as shown in FIG. 2 are interrelated, with respect to their use within the system. And the processing of the statistics information, the call detail information and the reference information of course are performed by the TVS system 16, as discussed in the TVS co-pending application. By thus partitioning the database system into separate structures, each dealing with particular types of information, the present invention database system enables the TVS server to have an extremely high processing rate, both for inserting the data into the system and for extracting out stored data for reporting purposes.

The actual hardware components of the database system of the instant invention is shown in FIG. 5, and particularly is represented by storage works 202 which in actuality may comprise multiple electronic disk storage mediums such as the SA900 disk storage system made by the Digital Equipment corporation. Inasmuch as FIG. 5 is the same as FIG. 8 of the TVS co-pending application, a discussion thereof may be had by referencing the discussion of FIG. 8 of the TVS co-pending application.

Inasmuch as the present invention is subject to many variations, modifications and changes in detail, it is intended that all matter described throughout this specification and shown in the accompanying drawings be interpreted as illustrative only and not in a limiting sense. Accordingly, it is intended that the invention be limited only by the spirit and scope of the appended claims.

We claim:

1. In a telecommunications network, a method of storing data, comprising the steps of:
   (a) retrieving from a traffic data collection system statistics data collected by said traffic data collection system;
   (b) grouping the statistics data into different types of statistics data;
   (c) routing each of the different types of statistics data to its own file storage in a fast response storage means;
   (d) retrieving from each said file storage in said fast response storage means at predetermined periodic time periods respective stored sets of said different types of statistics data; and
   (e) storing each said stored set of respective said different types of statistics data to a slower response storage means at a predefined time period for longer term storage.

2. The method of claim 1, further comprising the steps of:
   retrieving from said traffic data collection system call details data collected by said traffic data collection system; and
   storing said call details data to a call detail file at said slower storage means as soon as said call details data is collected from said traffic data collection system.

3. The method of claim 1, further comprising the steps of:
   retrieving reference data collected by said traffic data collection system;
   grouping the reference data into respective sets of customer data required for generating reports to be provided to subscribers of said network; and
   storing the respective sets of customer data into corresponding files in said slower storage means.

4. The method of claim 1, wherein said traffic data collection system collects reference data from said network, said reference data including customer phone number data, report data, delivery address data for reports, ncode mapping data, and country and state mapping data, said method further comprising the step of:
   storing said reference data into respective storage files corresponding to at least said phone number data, report data, delivery address data, ncode mapping data, and country and state mapping data.

5. The method of claim 1, wherein said step (a) further comprises the step of:
   utilizing a plurality of retrieve means for retrieving said statistics data;
   wherein said fast response storage means is divided into a plurality of storage areas each for receiving the same type of statistics data from said plurality of retrieving means.

6. The method of claim 5, further comprising the steps of:
   dividing said slower response storage means into a plurality of storage areas;
   wherein said step (d) further comprises the step of:
      utilizing a plurality of data moving means to move the same type of statistics data from each of said storage areas of said fast response storage means to a corresponding storage area of said slower storage means.

7. A method of storing various data from a telecommunications network, comprising the steps of:
   (a) collecting at least statistics, call details and reference data from said network;
   (b) storing said call details data in a first storage means;
   (c) storing said reference data in said first storage means;
   (d) grouping the statistics data into different types of statistics data;
   (e) routing each of said different types of statistics data to a second storage means, said second storage means operating substantially faster than said first storage means;
   (f) retrieving from said second storage means at predetermined periodic time periods respective stored sets of said different types of statistics data; and
   (g) storing said respective stored sets of different types of statistics data to said first storage means at a predefined time period for longer term storage.

8. The method of claim 7, wherein said step (b) further comprises the step of:
   storing said call details data into a call details file in said first storage means;
   said method further comprising the steps of:
      grouping said reference data into respective sets of customer data; and
      wherein said step (c) further comprises the step of:
         storing said respective sets of reference data into corresponding storage files in said first storage means, said storage files in said first storage means including at least a phone number data file, report data file, delivery address data file, ncode mapping data file, and country and state mapping data file.

9. The method of claim 7, further comprising the steps of:

partitioning said second storage means into a plurality of storage files for receiving said different types of statistics data;

routing each of said different types of statistics data to a corresponding one of said storage files in said second storage means so that the same type of statistics data is stored in the same storage file of said second storage means.

10. The method of claim 7, further comprising the steps of:

dividing said first storage means into a plurality of storage files;

wherein said step (g) further comprises the step of:

storing the same type of statistics data from said respective sets of different types of statistics data to the same storage file in said first storage means.

11. The method of claim 7, further comprising the step of:

utilizing said stored call details data, said reference data and said statistics data to generate reports for customers who subscribe to a special call service.

12. A database system for storing data of special service calls in a telecommunications network, comprising:

means for collecting at least call details data, reference data and statistics data from the calls in said network;

first storage means for storing said call details data and reference data of the calls in said network;

means for separating said statistics data into a plurality of different types of statistics data; and second storage means having a plurality of storage files each for storing one type of said statistics data so that said plurality of different types of statistics data are each stored in a corresponding one of said plurality of storage files in said second storage means, said second storage means operating substantially faster than said first storage means for receiving said statistics data;

wherein at a predefined time for each given time period, said second storage means downloads said different types of statistics data to said first storage means.

13. The system of claim 12, wherein said first storage means further comprises:

a call details file into which said call details are stored; and at least one phone number data file, report data file, delivery address data file, ncode mapping data file, and country and state mapping data file;

wherein said retrieved reference data includes different types of data including at least phone number data, report data, delivery address data, ncode mapping data, and country and state mapping data; and wherein said retrieved data is sorted into the different types of data each being stored in a corresponding one of said phone number data file, report data file, delivery address data file, ncode mapping data file, and country and state mapping data file.

14. The system of claim 12, wherein said basic types of data includes at least summary data, termination data, number plan area (NPA) data, telephone number prefix (NXX) data, and country data; and wherein said second storage means includes at least a summary data file, a termination data file, a NPA data file, a NXX data file, and a country data file each for storing corresponding said basic types of data.

15. The system of claim 12, further comprising the step of:

means utilizing said stored call details data, said reference data and said statistics data to generate reports for customers who subscribe to said special service calls.

16. In a telecommunications network, a system for storing data, comprising:

means for retrieving from a traffic statistics system at least call statistics collected by said traffic statistics data system;

means for grouping said statistics data into different types of statistics data;

a first memory means having a plurality storage files;

means for routing each of said different types of statistics data to its own storage file in said first memory means to form respective sets of different types of statistics data;

means for retrieving from each of said storage files in said first memory means at predetermined periodic time periods respective stored sets of said different types of statistics data; and a second memory means for storing each said stored set of respective types of statistics data at a predefined time period for longer term storage, said second memory means operating slower than said first memory means.

17. The system of claim 16, wherein said retrieving means further retrieves from said traffic data collection system call details data collected by said traffic data collection system, said system further comprising:

a second memory means having a call details data file for storing said call details data, said second memory means storing said call details data as soon as said call details data is collected from said traffic data collection system.

18. The system of claim 16, wherein said retrieving means further retrieves from said traffic data collection system different types of reference data collected by said traffic data collection system, said reference data including at least phone number data, report data, delivery address data, ncode data, and country/state data;

wherein said second memory means comprises at least one phone number data file, one report data file, one delivery address file, one ncode data file and one country/state data file each for storing the corresponding type of reference data.

19. In a telecommunication network, a method of storing data, comprising the steps of:

(a) retrieving from a traffic data collection system records containing statistics data collected by said traffic data collection system;

(b) removing said statistics data from said records and grouping said statistics data into different types of statistics data;

(c) routing each of said different types of statistics data to its own file storage in a fast response storage means;

(d) retrieving from each said file storage in said fast response storage means at predetermined periodic time periods respective stored sets of said different types of statistics data; and (e) storing each said stored set of respective different types of statistics data to a slower response storage means at a predefined time period for longer term storage.

20. The method of claim 19, further comprising the steps of:

extracting from said records retrieved from said traffic data collection system call details data collected by said traffic data collection system; and storing said call details data to a call detail file at said slower storage means as soon as said call details data is collected from said traffic data collection system.

21. The method of claim 19, further comprising the steps of:

retrieving from said records reference data collected by said traffic data collection system;

grouping the reference data into respective sets of customer data required for generating reports to be provided to subscribers of said network;

storing the respective sets of customer data into corresponding files in said slower storage means.

22. The method of claim 19, wherein said records from said traffic collection system include reference data, said reference data including customer phone number data, report data, delivery address data for reports, ncode mapping data, and country and state mapping data, said method further comprising the step of:

storing said reference data into respective storage files corresponding to at least said phone number data, report data, delivery address data, ncode mapping data, and country and state mapping data.

23. The method of claim 19, wherein said step (a) further comprises the step of:

utilizing a plurality of retrieve means for separating said statistics data from said records;

wherein said fast response storage means is divided into a plurality of storage areas each for receiving the same type of data from said plurality of retrieving means.

24. The method of claim 23, further comprising the steps of:

dividing said slower response storage means into a plurality of storage areas;

wherein said step (d) further comprises the step of:

utilizing a plurality of data moving means to move the same type of data from each of said storage areas of said fast response storage means to a corresponding storage area of said slower storage means.

* * * * *